E. H. FREEMAN.

ADJUSTABLE CASING FOR LAMP SOCKETS.

APPLICATION FILED AUG. 9, 1910.

Reissued May 30, 1911.

13,247.

WITNESSES

T. L. Bockee

Emory L. Groff

INVENTOR

Edgar H. Freeman

By S. P. Holcomb

Attorney

UNITED STATES PATENT OFFICE.

EDGAR H. FREEMAN, OF TRENTON, NEW JERSEY.

ADJUSTABLE CASING FOR LAMP-SOCKETS.

13,247. Specification of Reissued Letters Patent. Reissued May 30, 1911.

Original No. 927,344, dated July 6, 1909, Serial No. 443,726. Application for reissue filed August 9, 1910. Serial No. 576,430.

*To all whom it may concern:*

Be it known that I, EDGAR H. FREEMAN, a citizen of the United States, residing at Trenton, in the county of Mercer and State of New Jersey, have invented certain new and useful Improvements in Adjustable Casings for Lamp-Sockets, of which the following is a specification.

This invention relates to certain new and useful improvements in electric lamp fittings and more particularly to an improved snap casing or shell for the sockets of lamps of this character.

The invention has for its object the production of a casing or shell provided with improved means for detachably and adjustably uniting the cap with the body thereof in such manner that the slot, through which the circuit controlling key protrudes, may be properly positioned to make said key readily and conveniently accessible irrespective of the location of the socket casing with relation to its support.

A further object is to provide the body of the shell or casing with a plurality of positioning slots and a single locking hole and to provide the cap with uniform locking means adapted to engage either of said slots.

The invention will be hereinafter fully set forth and particularly pointed out in the claims.

Figure 1:
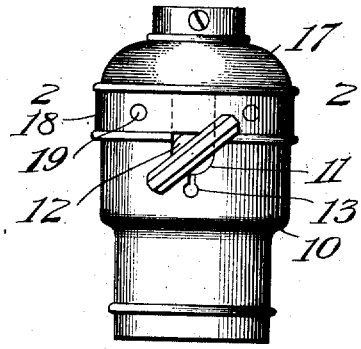
Figure 2:
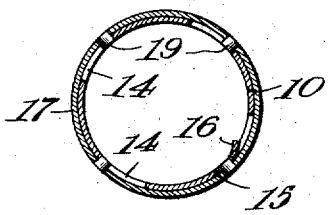
Figure 3:
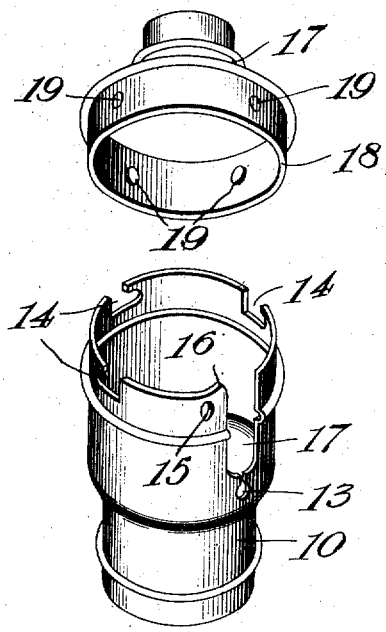

In the accompanying drawings—Figure 1 is a side elevation illustrating my improved socket casing incasing therein an ordinary lamp socket. Fig. 2 is a transverse sectional view on line 2—2, of Fig. 1, omitting the socket. Fig. 3 is a perspective view with the cap and body separated.

Like characters of reference designate corresponding parts.

Referring to the drawings, 10 designates the body of my improved casing, the same being of any suitable contour and usually provided with the ordinary longitudinal slot 11 for the accommodation of the lamp key 12. In order to render the wall of the casing 10 freely resilient adjacent the slot 11, the metal may be slit as indicated at 13.

One edge portion of the body 10 is provided with a plurality of bayonet slots 14 and with a single locking hole 15, the latter being equidistant from transverse portions of the adjacent bayonet slots and edge of slot 11 contiguous to the locking hole 15 and constituting a tongue or lip that is preferably bent slightly inward as indicated at 16.

The cap 17 is provided with a flange 18 constructed to fit over one end of the body 10 and is provided with a plurality of inwardly extended equidistant lugs 19 corresponding in number and position to the bayonet slots 14 and hole 15, combined.

In practice the cap 17 is secured to a bracket or other support in the usual manner, and the casing 10, carrying the usual socket and plug, secured thereto. In order to attach the body 10 to the cap 17 the bent portion 16 and the longitudinally disposed portions of the bayonet slots 14 are brought opposite the lugs 19 and the said body pushed into the cap. The body is then turned slightly to the right to bring the lugs 19 into the horizontal portions of slots 14, whereupon the lug 19 that passes over the bent portion 16 will ride thereover, and snap into the locking hole 15, thus firmly locking the parts together. With this construction therefore, it will be evident that when certain of the lugs 19 are in position to enter the bayonet slots, the other lug will be positioned over the inwardly bent tongue or lip 16. Therefore the body can be pushed into the cap without interference until the lugs 19 are in line with the transverse portions of the bayonet slots, inasmuch as the said lug will slip over the tongue or lip. A part turn will carry the three lugs into said transverse portions of the bayonet slots while the fourth lug will be simultaneously moved into the opening 15. The inturned tongue or lip therefore is an important feature, and its particular location, being formed by the corner that is produced by the slot 11. The particular relation of the parts therefore is such that there has to be no careful adjustment of the cap to the body. It can be applied indiscriminately and rotated, for just as soon as three of the lugs aline with the bayonet slots, the fourth comes over the tongue and the two members slip into interlocking relation and they cannot incorrectly interlock, for the lugs that engage in the bayonet slots prevent the remaining lug from slipping into the key-receiving slot.

When it is desired to separate the body from the cap, the wall adjacent the locking hole 15 is pressed in, whereupon the body 10 may be turned to the left to disengage lugs 19 from said hole and the slots 14, the bent portion 16 serving to minimize the resistance. Should the key 12 not come into a convenient or accessible position when the cap and body are first united, it is only necessary to disengage the parts as just described, and turn the body 10 to the desired position. In this connection it will be noted that the lugs 19 are of the same shape, the same size, and equidistant, affording practically a universal relative adjustment between the cap and shell. It will be further understood that the range of this adjustment may be varied by increasing or diminishing the number of bayonet slots 14, so long as the hole 15 is equally spaced therefrom, the number of lugs 19 being also correspondingly varied.

As above pointed out, one of the important features of the invention resides in the inturned tongue or lip 16 in combination with the single locking hole 15 and a plurality of locking lugs 19. As shown, these locking lugs are all of the same size and shape and are of such a form as to present abrupt shoulders on opposite sides, thus providing for securely locking the cap against turning in either direction after having been once positioned. These abrupt-shouldered locking lugs 19 glide over the lip 16 when the cap is placed over the shell.

Claims:—

1. A casing for incandescent lamps comprising a body provided with a plurality of positioning slots opening through one end, and a single locking hole, an edge portion of the body adjacent said hole being bent to form a yielding lip or tongue, and a cap provided with a plurality of equidistant lugs having abrupt locking shoulders on opposite sides and each arranged to engage in any of said positioning slots or in said hole, and said lugs simultaneously entering the positioning slots and passing over the lip or tongue into the hole.

2. A casing for incandescent lamps, comprising a body provided with a plurality of bayonet slots and a key-receiving slot opening through one end, and a single hole adjacent said end and said key-receiving slot, the corner of said body formed by said end and key slot contiguous to said hole being bent inwardly forming a yielding tongue or lip, and a cap provided with a flange constructed to fit over the slotted end of said body, said cap being provided with a plurality of inwardly extending lugs having abrupt locking shoulders on opposite sides and each arranged to engage in any one of said bayonet slots or in said hole, and said lugs simultaneously entering the bayonet slots and passing over the tongue or lip to a position to engage in the hole.

3. An adjustable casing for electric lamp sockets comprising a cap member and a compressible shell member, one of said members provided with a plurality of spaced openings, the other of said members provided with the same number of equidistant lugs as the openings and each of which lugs coöperates with any of said openings to admit of relative circular-adjustment between the cap and shell, all of said lugs except one being adapted for disengagement upon partial relative rotation of the cap and shell, and said remaining lug and one of the openings constituting locking means adapted for disengagement only on compression of said shell prior to said relative rotation, and all of the lugs and openings, when engaged, coöperating to lock the shell and cap members against longitudinal movement, and one of said lugs and the opening which it engages cooperating to lock the shell and cap members against relative rotary movement in either direction.

EDGAR H. FREEMAN.

Witnesses:
BESSIE BATH,
ADELAIDE HENRY.

Copies of this patent may be obtained for five cents each, by addressing the "Commissioner of Patents, Washington, D. C."